March 22, 1960
J. P. LANDIS ET AL
2,929,771
APPARATUS FOR THE PRODUCTION OF COMPOUNDS BY
MEANS OF AN ELECTRIC ARC
Filed Sept. 7, 1956
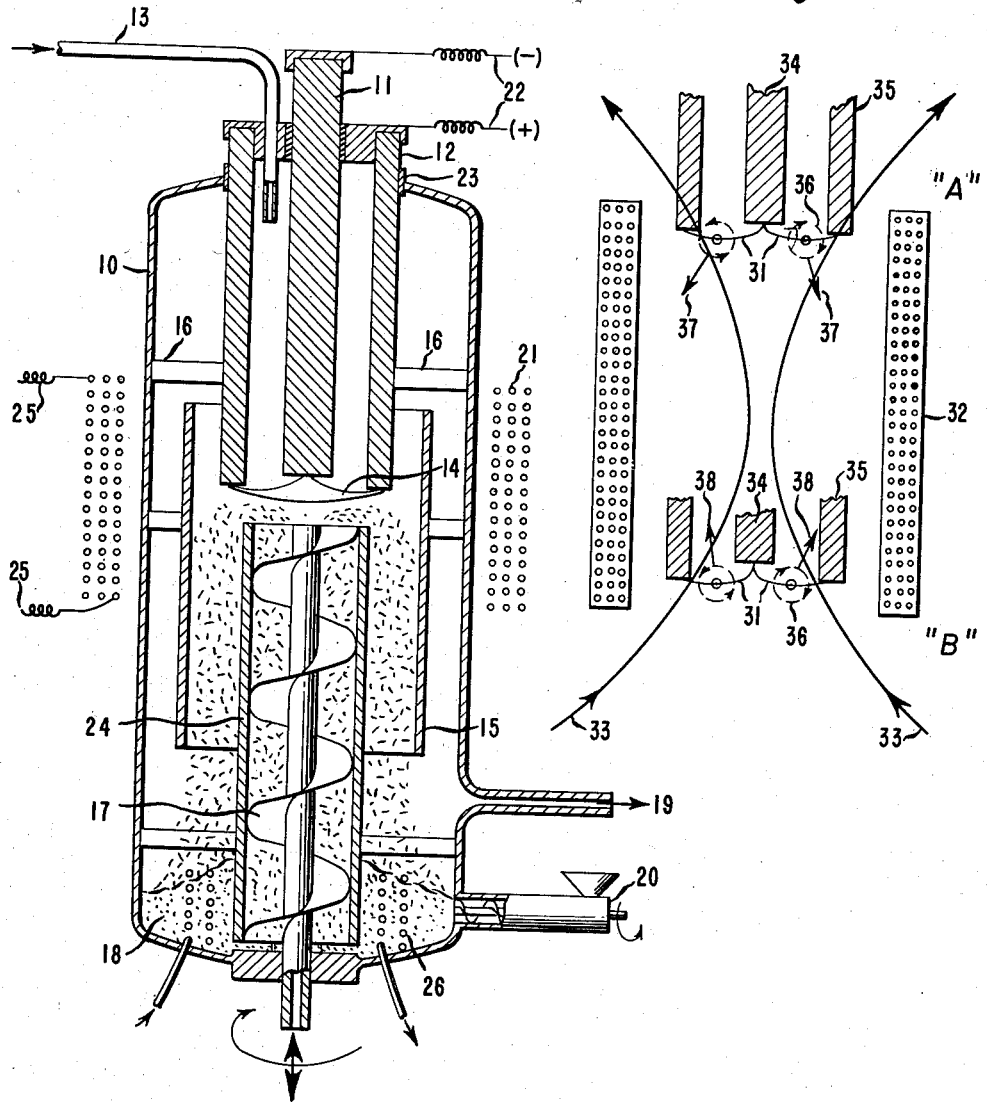
INVENTOR
JAMES P. LANDIS
CARL H. MANWILLER
BY
ATTORNEY United States Patent Office 2,929,771
Patented Mar. 22, 1960

2,929,771
APPARATUS FOR THE PRODUCTION OF COMPOUNDS BY MEANS OF AN ELECTRIC ARC

James Philip Landis and Carl Harding Manwiller, Wilmington, Del., assignors to E. I. du Pont de Nemours and Company, Wilmington, Del., a corporation of Delaware Application September 7, 1956, Serial No. 608,571

4 Claims. (Cl. 204—311)

The present invention relates to an apparatus for carrying out solid-gas reactions at very high temperatures, and more particularly, to an apparatus for reacting gaseous materials with the aid of a rotating arc.

By heating gaseous compounds to very high temperatures, such as temperatures above 2000° C., a gas may be split into reactive radicals which may then react with a solid, in particular with carbon to give desirable organic reaction products. Since the desired end reaction products are generally not stable at the temperatures at which the radicals exist, and to furthermore prevent recombinaton of the radicals to the starting material, it is necessary to contact the gaseous materials containing the radicals with carbon and then rapidly cool the reaction products to a temperature at which the desired reaction products are stable. This is preferably accomplished by combining the hot gases with finely divided carbon, such that the carbon not only acts as a reactant, but also as a quenching medium. An example of such a reaction is the preparation of tetrafluoroethylene from phosphorus pentafluoride. The heating of phosphorus pentafluoride to temperatures above 1500° C. will cause the gas to split into phosphorus trifluoride and fluorine radicals, which readily react with carbon to give rise to perfluorinated hydrocarbons. If the reaction is carried out in the presence of insufficient carbon, e.g. carbon from the electrodes alone, carbon tetrafluoride will be primarily formed; if, however, the gas is contacted with an excess of carbon, e.g. a stream of finely divided carbon, then tetrafluoroethylene is formed in preference to carbon tetrafluoride. Similar reactions involving heating to high temperatures, formation of active radicals and reaction of the active radicals with carbon, followed by rapid cooling are employed to prepare acetylene from hydrocarbons, and hydrogen cyanide from ammonia.

The electric arc is extremely well suited to provide the combination of heating to high temperatures followed by rapid quenching since the arc of a high density current has extremely high temperatures, up to and above 4000° C. and yet a very low radiant energy transfer. Thus, it is possible to bring a stream of quench carbon close to the arc without causing the carbon to become overly heated and contact the gases with the carbon while they are still hot enough for the reactive radicals to exist. Although the low radiant energy transfer is of great advantage in contacting the hot gas with quench carbon, the low radiant energy transfer poses an even greater disadvantage in uniformly heating the gas to the high temperatures required to cause decomposition, since it will be necessary to pass all of the gas through the arc column itself to obtain the reaction temperatures. However, this latter problem has been ingeniously solved by employing an arc in an annular electrode gap in which the arc rotates under the influence of a magnetic field having lines of force essentially perpendicular to the plane of rotation of the arc. Since the arc rotates at speeds measured to be greater than 10,000 revolutions per second, the arc can slice increments of the gas stream passing through the annular gap which are smaller than the arc diameter and thus contact all of the gas to be heated, even though the gas may be passed through the arc at high velocities. The rotating arc, in contrast to a stationary arc, represents a highly efficient method for heating all of the gaseous starting materials to temperatures at which the gas will decopose into reactive radicals.

As stated hereinabove, the yield of the desired reaction product will depend on contacting the gases emerging from the arc, at temperatures at which reactive radicals can exist, with carbon to cause the formation of the desired reaction products and rapidly cooling the products to temperatures at which these products are stable, the latter being achieved by employing cold carbon which will act as a reactant as well as a quenchig medium. The yield of the desired reaction products will therefore increase, the smaller the distance that the reactive radicals have to travel before contacting the carbon. A highly efficient system can, however, only be achieved if the arc rotates in a specifically defined volume such that it is possible to bring the solid close to the arc without damaging the means for conveying the solid to the arc or contacting the solid with the arc.

It is, therefore, one of the objects of the present invention to provide a high temperature reactor. It is another object of the present invention to provide an apparatus wherein a gaseous product is uniformly heated to very high temperature by a rotating arc and thereafter contacted with a finely divided solid. It is a further object of the present invention to provide a rotating arc furnace wherein the locus of the arc is defined and controlled. Further objects of the present invention will become apparent hereinafter.

The objects of the present invention are accomplished by an apparatus which comprises an insulated shell, electrodes extending into said shell, the tips of said electrodes forming an essentially planar, annular gap, means for creating and maintaining a continuous electric discharge between said electrodes, external means for creating a steady magnetic field in said shell, said field having its axis of symmetry normal to the plane of said annular gap, a gas inlet for conveying gaseous material to said annular gap, means for contacting a finely divided solid with gaseous products emerging from said gap and a gas outlet whereby gaseous products are removed from said reaction vessel. In a preferred embodiment the electrodes are concentric, cylindrical carbon electrodes forming an annular gap in which a high density direct current discharge is rotated by the magnetic field created by a solenoid placed around the shell of the reactor, concentric with the said electrodes. The apparatus of the present invention is, of course, not limited to the use of a solid as the quenching medium or reactant. Means for contacting the gaseous products emerging from the arc with gases or liquids may readily be substituted for those employed to contact the gaseous products emerging from the arc with a solid.

In the conventional construction of a rotating arc furnace, in general, the hollow electrode is opposed to the solid electrode or the hollow electrode is employed as the vessel or shell of the reactor, surrounding the center electrode. It was found that in such an arrangement the rotating arc will move under the force created by its own magnetic field towards the end of the center electrode. This force furthermore has the effect of straightening the arc into the direction of the axis of rotation. The arc, therefore, does not rotate in the shortest distance between the tip of the center electrode and the hollow outer electrode, but moves along the sides of the hollow electrode in the direction of the axis of rotation. As a result of this motion along the hollow anode, it is not possible to bring the finely divided carbon up close to the rotating arc without damaging the means which deliver the carbon to the hot gaseous products emerging from the arc. The arc, in wandering along the walls of the anode, will readily strike the means employed in delivering the solid to the arc, such as a feed screw, and cause considerable damage as well as overheat the carbon, thereby decreasing the efficiency of the quenching. If the feed screw is maintained sufficiently far away to avoid arc jetting, the gaseous reactive radicals can cool off sufficiently to recombine and give rise to undesirable side products.

The present invention provides a method and apparatus wherein the arc rotates in a limited volume and is not subject to motion along the axis of the hollow anode and wherein the plane of rotation of the arc is controlled within specific geometrical limits. By having the electrode tips in essentially planar position and by withdrawing the current in the opposite direction in which the current is fed to the arc, the effect of the magnetic forces which draw out the arc in the direction of the axis of rotation are opposed by the electromotive force across the electrodes and the arc is forced to strike from one tip to the other tip of the electrodes. It was found that the length of the arc is not decreased by such an electrode arrangement. However, rather than extending along the axis of the electrodes, the arc is forced into the plane formed by the ends of the two electrodes and assumes a partially coiled path. The coiled arc, when rotated by the magnetic field, assumes a pinwheel pattern which is beneficial for improved heating of the gas, since it provides a greater arc length for the gap through which the gas to be heated passes. It was furthermore found that the shape of the arc, when forced to rotate in a plane, is strongly susceptible to the external magnetic field which causes it to rotate. Thus, where the magnetic lines of force are completely perpendicular to the plane of the arc rotation, the arc will remain flat. If a small magnetic force horizontal to the arc is created, as it will occur near the ends of a solenoid type of magnetic field, the arc is distorted out of the arc rotation plane in a direction which depends on the symmetry of the magnetic field with respect to the arc. This horizontal component of the solenoid type of magnetic field which is zero at the center of the solenoid and increases towards the ends of the solenoid is therefore highly suitable for controlling the exact location of the arc. By adjusting the position of the solenoid with respect to the arc or by varying the distribution of ampere-turns along the solenoid, it is possible to control the distance which the arc will bow out from the straight line between the tips of the electrodes. As a result, the arc can be adjusted to rotate in an area which is very close to the area in which the carbon particles are admixed with the gaseous product emerging from the arc without causing arc jetting to the feed screw or other device employed to deliver the solid carbon particles.

The preferred type of arc employed in the present invention is an arc of a high density direct electric current. The amperage of the current will determine, at least in part, the temperature of the arc. The voltage of the arc will be determined by the length of the arc, pressure and the type and rate of the gas fed to the arc. The direct current arc is greatly preferred over an alternating current arc, since the direct current gives rise to an arc with continuous rotation, whereas the alternating current arc gives rise to an oscillating arc. Furthermore, the alternating current arc is of lower stability and limited to small arc gaps since the arc must be reignited on each phase change of the current. Various means may be employed to initiate the arc, such as short circuiting the electrodes or causing a high frequency high voltage spark to jump across the electrodes by means of auxiliary equipment.

The arc reactor, in general, employs graphite or carbons as the material of construction, except for those parts which do not come directly in contact with the intense heat of the arc. Where the electrodes are carbon or graphite, it is necessary to employ the center electrode as the cathode and the outer electrode as the anode. It was found that the cathode spot of the arc does not revolve on the edge of the cathode, but remains essentially stationary in the center of the tip of the inner electrode. The high stability of the direct current arc allows wide variation in the diameter and the width of the gap. The preferred size of the gap is dependent on the rate of the starting material fed. Since some of the carbon of the electrodes is consumed by the arc and the radicals formed in the arc, the preferred form of the electrodes employed is a cylindrical electrode, the length of which, extending into the reactor, can readily be adjusted and in which the arc gap remains unchanged, even though the electrodes may be partially consumed.

The magnetic field employed to cause the rotation of the arc may be obtained from various sources. The preferred method of obtaining the magnetic field is as described through the use of a solenoid. The rotation of the arc is caused by that component of the magnetic field which is parallel to the axis of rotation of the arc. As pointed out hereinabove, the component of the magnetic field which is parallel to the plane of rotation may be employed to control any distortion of the arc out of its plane of rotation. This parallel component of the field can be adjusted by location of the coil with respect to the electrodes or by varying the distribution of ampere-turns along the length of the coil. The quantitative relationship of the field strength of the magnetic field to the rotation of the arc is not clearly understood at the present time. In general, it was found that a field strength of 100 gauss was sufficient to rotate arcs up to 5" in length.

The features of the present invention are illustrated by the attached drawings, in which Figure 1 shows a vertical sectional view of one form of an arc reactor embodying the features of the present invention, and Figure 2 shows schematically the method employed to control the path of the arc.

Referring to Figure 1 of the drawings, the rotating arc is enclosed by the shell 10, which is constructed out of metal, water cooled and provided with a lining of carbon or graphite bricks and appropriate thermal insulation. At the top of the shell the two electrodes—the cylindrical solid cathode 11 and the cylindrical hollow anode 12—are concentrically and vertically inserted into the furnace chamber so as to form an annular arc gap. The tips of the electrodes are adjusted in such a manner as to essentially form a horizontal plane in which the arc 14 rotates. The electrodes are connected to a source of direct current 22 and are suitably insulated at 23 from contact with the shell of the arc furnace. The electrodes are further held in position by the brackets 16. The water-cooled feed screw 17 driven by a motor not shown in the drawings, delivers the finely divided solid from its reservoir 18 at the bottom of the arc reactor through the shaft 24 up to the rotating arc 14 where the solid is contacted with the gaseous decomposition products of the feed gas. The cylindrical carbon shield 15 further protects the reactor shell from the heat of the rotating arc and also directs the unreacted solid and the reaction products into a downward flow. The solid drops back into the reservoir where it is cooled by the cooling coil 26, while the gaseous reaction products are removed through the gas outlet 19. A small screw feeder 20 is attached to the solid reservoir to replenish the solid which is converted to products in the reaction with the gaseous decomposition products from the arc. The rotation of the arc is provided by the magnetic field created by the solenoid coil 21 placed around the exterior of the arc reactor. The coil is powered by a direct current source 25. The solenoid coil is adjustable and can be moved upwards or downwards along the arc furnace wall to result in the desired distortion of the arc.

Figure 2 of the drawings shows schematically the method of controlling the path of the rotating arc. The rotating arc 31 is shown in two positions "A" and "B," with respect to the solenoid 32. The electric current passing through the solenoid 32 creates a magnetic field having magnetic lines of force 33 which are parallel to the axis of the solenoid in the center of the solenoid and which have an increasing horizontal force component towards the ends of the solenoid. The arc 31 is rotated by the vertical component of the magnetic field in the annular arc gap formed by the cathode 34 and the cylindrical hollow concentric anode 35. The arc column creates its own magnetic field 36 which surrounds the arc column. As a result of the interaction of the magnetic field of the solenoid and the magnetic field created by the arc column, the arc is pushed in the direction indicated by arrows 37. As the arc is moved towards the center of the solenoid the force resulting from the interaction of the two magnetic fields becomes smaller and is eliminated at the exact center of the solenoid where the magnetic lines of force of the external magnetic field are vertical. As the arc approaches position "B" the interaction of the two magnetic fields causes the arc to be distorted in the opposite direction as indicated by arrows 38. Thus by changing the position of the arc with respect to the solenoid it is possible to control the geometrical configuration of the arc. The same effect may be accomplished by employing a solenoid with two or more sections. By varying the strength of the current in each of the sections of the solenoid the component of the magnetic field parallel to the plane of the arc may be controlled to give the desired distortion of the rotating arc.

The present invention provides a simple apparatus for carrying out chemical reactions gaseous materials which require high initial temperatures, followed by rapid cooling and/or reaction with a solid to obtain the desired reaction product. Because of the high conversion of electrical energy to heat energy and because of the ability of the rotating arc to intimately contact the gas, an efficient method of heating is obtained by the use of the rotating arc furnace. By employing a rotating arc, the rotation of which is controlled within narrowly defined volumetric limits, it is possible to contact the gaseous products emerging from the arc without delay with the finely divided carbon to cause reaction of the products from the arc with the carbon or to cause rapid quenching.

While the present invention has been described with reference to particular embodiments thereof, it will be understood that numerous modifications may be made by those skilled in the art without departing from the scope thereof, except as set forth in the appended claims.

We claim:

1. A high temperature reaction vessel comprising an insulated shell, two concentric cylindrical electrodes extending into said shell an essentially equal distance and forming an annular gap, a means for creating and maintaining a direct current discharge across said electrodes such that the inner electrode is the cathode and the outer electrode the anode, a solenoid positioned externally to said shell and concentric with said electrodes, said solenoid producing magnetic lines of flux parallel to the axis of said electrodes and adjustable lines of flux parallel to the plane of said annular gap at said annular gap, means for supplying direct current to said solenoid, a gas inlet between said electrodes for conveying gaseous material to said annular gap, means, located within said insulated shell and adjacent to said annular electrode gap, for contacting the gaseous arc effluent at its emergence from the arc with a continuous stream of finely divided, discrete, solid particles at substantially lower temperature, and a gas outlet whereby gaseous products are removed from said reaction vessel.

2. The apparatus as set forth in claim 1 wherein the electrodes are carbon electrodes.

3. The apparatus as set forth in claim 1 wherein the field strength of the solenoid is adjustable along the length of its axis.

4. The apparatus as set forth in claim 1 wherein the position of the solenoid is adjustable along its axis.

References Cited in the file of this patent

UNITED STATES PATENTS

| 715,901 | Thompson | Dec. 16, 1902 |
| 777,991 | Werner | Dec. 20, 1904 |
| 898,346 | Ferranti | Sept. 8, 1908 |
| 1,094,355 | Wilmowsky | Apr. 21, 1914 |
| 1,323,304 | Mauclaire | Dec. 2, 1919 |
| 1,796,969 | Strobel | Mar. 17, 1931 |
| 1,830,615 | Mercier | Nov. 3, 1931 |
| 2,052,796 | Rava | Sept. 1, 1936 |

FOREIGN PATENTS

| 24,296 | Great Britain | 1906 |